US008860989B2

(12) United States Patent
Link et al.

(10) Patent No.: US 8,860,989 B2
(45) Date of Patent: Oct. 14, 2014

(54) SCANNER WITH EXCEPTION PREVIEW

(75) Inventors: Bruce A. Link, Rochester, NY (US); George E. Lathrop, Dansville, NY (US); Joseph John Furno, Rochester, NY (US); Jon McDonough, Rochester, NY (US); John D. Meierdiercks, Geneseo, NY (US)

(73) Assignee: Kodak Alaris Inc., Rochester, NY (US)

(*) Notice: Subject to any disclaimer, the term of this patent is extended or adjusted under 35 U.S.C. 154(b) by 206 days.

(21) Appl. No.: 13/326,368

(22) Filed: Dec. 15, 2011

(65) Prior Publication Data
US 2013/0155448 A1 Jun. 20, 2013

(51) Int. Cl.
G06F 3/12 (2006.01)

(52) U.S. Cl.
USPC ........... 358/1.15; 358/1.1; 358/474; 358/498; 358/449; 271/8.1

(58) Field of Classification Search
None
See application file for complete search history.

(56) References Cited

U.S. PATENT DOCUMENTS

| | | | | |
|---|---|---|---|---|
| 5,276,742 A * | 1/1994 | Dasari et al. | ............... | 382/297 |
| 5,532,839 A * | 7/1996 | Beikirch et al. | ............... | 358/401 |
| 5,901,253 A * | 5/1999 | Tretter | ............... | 382/289 |
| 6,370,277 B1 | 4/2002 | Borrey et al. | | |
| 6,407,599 B1 | 6/2002 | Phinney et al. | | |
| 6,511,064 B1 | 1/2003 | Phinney et al. | | |
| 6,520,498 B2 | 2/2003 | Phinney | | |
| 6,868,135 B1 | 3/2005 | Phinney et al. | | |
| 6,913,259 B2 | 7/2005 | Phinney et al. | | |
| 7,331,578 B2 * | 2/2008 | Sano et al. | ............... | 271/262 |
| 7,706,579 B2 * | 4/2010 | Oijer | ............... | 382/118 |
| 8,446,645 B2 * | 5/2013 | Okada | ............... | 358/474 |
| 2002/0054335 A1 | 5/2002 | Sekiguchi | | |
| 2005/0144562 A1 * | 6/2005 | Schena et al. | ............... | 715/741 |
| 2007/0183448 A1 * | 8/2007 | Ochiai | ............... | 370/463 |
| 2009/0168093 A1 * | 7/2009 | Kim | ............... | 358/1.15 |
| 2010/0027056 A1 | 2/2010 | Ogino et al. | | |
| 2010/0027059 A1 | 2/2010 | Ebi | | |
| 2010/0328734 A1 | 12/2010 | Okada | | |
| 2011/0279849 A1 * | 11/2011 | Umi et al. | ............... | 358/1.14 |
| 2011/0292434 A1 * | 12/2011 | Lim et al. | ............... | 358/1.15 |

FOREIGN PATENT DOCUMENTS

| | | |
|---|---|---|
| EP | 0 711 062 | 5/1996 |
| EP | 0 766 449 | 4/1997 |
| JP | 2010 157916 | 7/2010 |
| WO | 01/64229 | 6/2011 |

* cited by examiner

*Primary Examiner* — Paul F Payer
(74) *Attorney, Agent, or Firm* — Hogan Lovells US LLP

(57) ABSTRACT

A scanning system is described providing an exception correction capability during multi-page scanning operations. A sensing system is used to sense exception conditions during a multi-page scanning operation. In response to detecting an exception, at least one scanned page associated with the exception condition is displayed on an image display and a user interface system is used to provide a plurality of user-selectable corrective actions associated with the exception condition. One or more corrective operations are then performed in response to a user selecting a particular corrective action.

21 Claims, 4 Drawing Sheets

SCANNER WITH EXCEPTION PREVIEW

CROSS-REFERENCE TO RELATED APPLICATIONS

Reference is made to commonly assigned, co-pending U.S. patent application Ser. No. 13/272,616, entitled: "Document scanner", by Pultorak; to commonly assigned, co-pending U.S. patent application Ser. No. 13/272,599, entitled "Determining document characteristics prior to scanning," by Pultorak; to commonly assigned, co-pending U.S. patent application Ser. No. 13/307,406, entitled: "Document scanner", by Link et al.; and to commonly-assigned, co-pending U.S. patent application Ser. No. 13/307,447, entitled "Method for scanning documents," by Link et al, each of which are incorporated herein by reference.

FIELD OF THE INVENTION

This invention relates to multi-page document scanning, and more particularly to a user interface for correcting detected exception conditions.

BACKGROUND OF THE INVENTION

Many document scanners include a document feeding system that moves a document from an input tray, through a transport path and creates an image of the document as it moves past a stationary imaging capture device such as a charge coupled device (CCD) or Contact Image Sensor (CIS). Sensors in the transport are used to make sure the document enters the transport correctly. Depending on the type of document or document characteristics, the operator must select functions and features to optimize the scanner to accommodate the specific requirements for a particular document.

In a document scanner, the documents to be scanned may vary by size, weight, color content, physical condition, or other characteristics, which may require different scanner features to be enabled or operator actions to be employed for the most optimal and efficient mode of operation. Since the scanner is not typically programmed with specific requirements on a document-by-document basis, the user may default the scanner to a set of less efficient settings that will process all documents within a batch. Alternately, the operator may manually sort the documents based on common document characteristics. Documents could be sorted based on document characteristics, such as length, width, weight, color, physical condition, or document type.

However in document scanning, sometimes a document may have characteristics that are incompatible with the scanner's setup or may require special processing to provide acceptable results. During these instances, it is important to detect the document and provide the scanner operator with an efficient method to handle the exception condition. The later in the scanning processing stream the exception is detected the more difficult and costly the recover process becomes.

Many prior art scanners provide an audio tone, or illuminate an "error" LED to notify the scanner operator when the scanner stops for an exception. In other scanners, a simple character-based display is used to display a short message to the scanner operator. For example, the Cannon DR-X10C scanner includes ultrasonic sensors that are used to detect multiple documents feed into the transport and provide an appropriate message on a character-based display. However, in many cases, the minimal amount of information that can be provided using this approach does not provide the scanner operator with sufficient information to properly evaluate the severity of the exception and determine an appropriate action.

U.S. Pat. No. 6,370,277 to Borrey et al., entitled "Virtual rescanning: a method for interactive document image quality enhancement," describes an image processing system for processing scanned images using user predefined parameters and acceptable tolerances. When a scanned image falls outside of the predefined parameter tolerances, the system invokes a real-time user interactive process to adjust image setting data used to process the scanned image.

U.S. Patent Application Publication 2010/0027056 to Ogino et al., entitled "Image forming apparatus, program, and preview display method," describes an image forming system including a preview that provides the capability to view preview images including information about finishing options before they are printed.

There remains a need for an improved method to enable a scanner operator to evaluate and correct for detected exceptions on a document-by-document basis, thereby improving the efficiency of the scanning process.

SUMMARY OF THE INVENTION

The present invention represents a scanning system providing an exception correction capability, comprising:
an image sensor for scanning a page of a hard-copy document;
   an input tray;
   an output tray;
   a document feeding system for picking a page of a multi-page document from the input tray, positioning the picked page to be scanned by the image sensor, and depositing the picked page in the output tray;
   a sensing system for sensing one or more attributes of the picked page to detect an exception condition;
   a user interface system including an image display and one or more user controls;
   an output interface for transferring scanned documents to an image receiving system;
   a storage memory for storing scanned documents;
   a data processing system; and
   a program memory communicatively connected to the data processing system and storing instructions configured to cause the data processing system to implement a method for providing an exception correction capability, wherein the method includes:
     initiating a multi-page scanning operation to scan a multi-page document in response to user activation of a user control;
     for each page of the multi-page document;
       picking the page from the input tray;
       scanning the picked page using the image sensor and storing the scanned page in the storage memory;
       sensing one or more attributes of the picked page using the sensing system;
       depositing the picked page in the output tray
       analyzing the sensed one or more attributes to detect an exception condition;
       in response to detecting an exception condition:
          pausing the multi-page scanning operation;
          displaying at least one scanned page associated with the exception condition on the image display;
          using the user interface system to provide a plurality of user-selectable corrective actions associated with the exception condition;

performing one or more corrective operations in response to a user selecting a particular corrective action; and restarting the paused multi-page scanning operation in response to user activation of a user control; and using the output interface to transfer one or more pages of the scanned multi-page document from the storage memory to the image receiving system.

This invention has the advantage that the scanner operator is enabled to more effectively handle exception conditions such as multi-page feeds at the scanner, thereby eliminating the more costly process of recovering from an exception document at the host application.

It has the additional advantage that previewing the scanned image associated with the exception condition provides the user with additional information about the exception that enables the scanner operator to more easily and efficiently determine the most appropriate corrective action.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus and method in accordance with the present invention. It is to be understood that elements not specifically shown or described may be selected from such systems, algorithms, components, and elements known in the art. In the following description, some embodiments of the present invention will be described in terms that would ordinarily be implemented as software programs. Those skilled in the art will readily recognize that the equivalent of such software may also be constructed in hardware.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
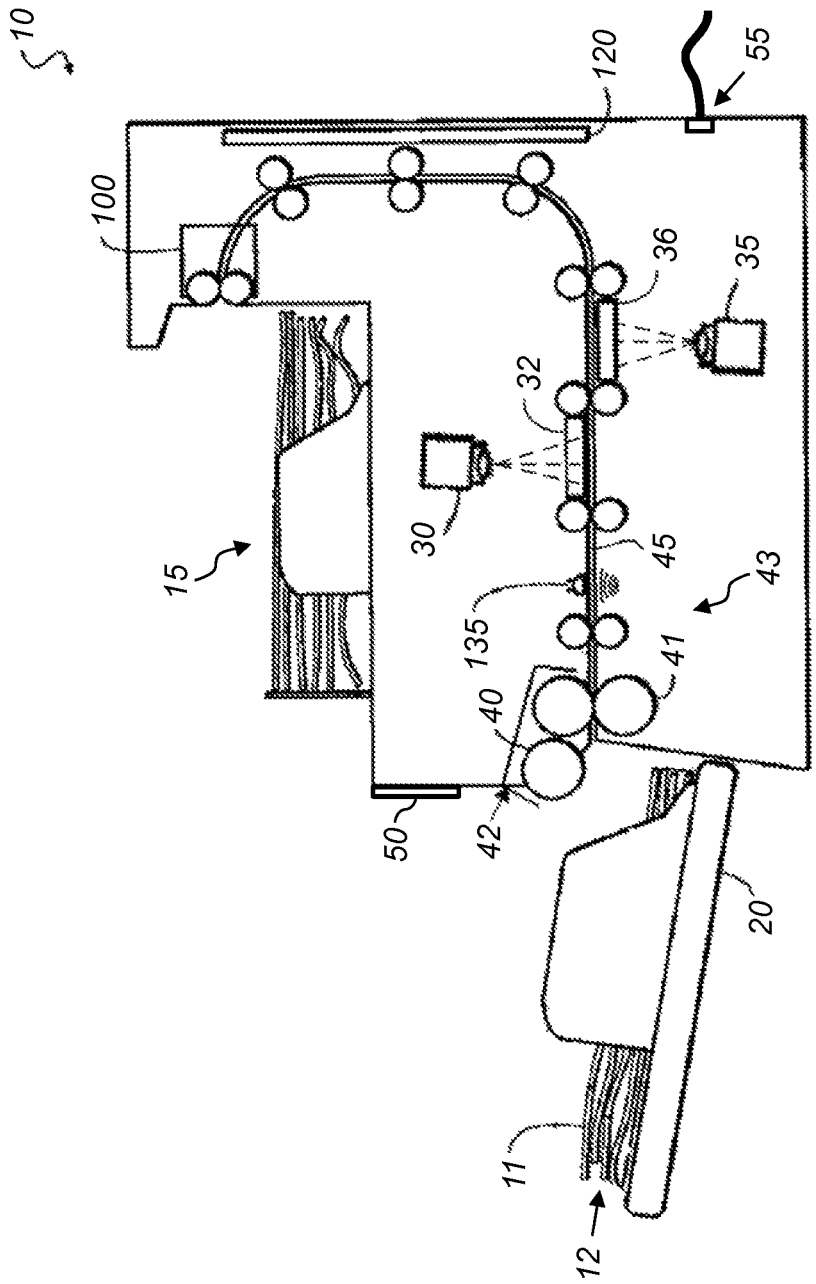
FIG. 1 is a cross-section view of a document scanner illustrating various components of the scanner that are related to the present invention.

FIG. 1 is a side cross-sectional view of a document scanner 10. The illustration shows an input tray 20 with containing a multi-page document 12 contains a plurality of document pages waiting to be scanned by the scanner, including the top page 11 which is the next page to be scanned. (It will be obvious to one skilled in the art that in other embodiments, the document scanner 10 can pick pages from the bottom of the stack rather than the top of the stack.) Within the context of the present invention, the term "multi-page document" is used to refer to a set of individual pages which are to be scanned in series, which may or may not be related to each other. In some cases, the multi-page document 12 can include a plurality of different "documents" (e.g., reports, contracts, correspondence, receipts and the like), which can each vary in length from a single document page to many individual document pages. The individual document pages of the multi-page document 12 can, in general, vary with respect to attributes such as paper/medium type, size, shape, weight, thickness, stiffness, and color.

The scanner 10 includes a document feeding system 43 for picking pages of the multi-page document 12 from the input tray 20, positioning the picked pages to be scanned, and depositing the picked pages in an output tray 15. The document feeding system 43 includes a feed module 42 with feed roller 40 and separator roller 41, a transport 45, and output rollers 100, as well as other rollers and document positioning mechanisms.

In a preferred embodiment, the scanner 10 is a duplex scanner including a top imaging device 30 and a bottom imaging device 35 adapted to scan the content on both sides of the document pages. In some embodiments, the scanner 10 may include only a single imaging device. In such cases, the document feeding system 43 can optionally include a duplexing mechanism to provide a duplex scanning capability. The duplexing mechanism can be used to turn a document page over and reposition it after scanning a first side in order to scan the second side. In other embodiments, the scanner 10 may only be provided with the capability to scan a single side of the document pages.

As shown in FIG. 1, documents are first placed in the input tray 20 of the scanner. A feed roller 40 within the feed module 42 selects and pulls the top page 11 from the input tray 20 into the transport 45. At the same time top page 11 moves into the transport 45, the document page in contact below top page 11 may also move forward but is prevented from entering the transport by a separator roller 41. However, sometimes the document page directly below top page 11 is mistakenly pulled into the transport due, for example, to static.

As top page 11 travels through the transport 45, it passes a document sensing system 135 including one or more associated sensors for sensing attributes of the picked page, a top imaging aperture 32 corresponding to a capture field of the top imaging device 30 and a bottom imaging aperture 36 corresponding to a capture field of the bottom imaging device 35. The top imaging device 30 images the document as it passes the top imaging aperture 32 while bottom imaging device 35 images the document as it passes the bottom imaging aperture 36. In some embodiments, the top imaging device 30 and the bottom imaging device 35 include linear image sensors (e.g., one-dimensional CCD sensor arrays) that capture a single line of image data at a time. Successive lines of image data are captured as the document moves past the linear sensors to provide a two-dimensional scanned image. In other embodiments, the top imaging device 30 and the bottom imaging device 35 may include two-dimensional image sensors that can simultaneously capture some, or all, of the lines of image data for the two-dimensional scanned image. As sensor data from the document sensing system 135 and image data from the top imaging device 30 and bottom imaging device 35 are captured, they are transmitted to be processed by a data processing system 120.

The data processing system 120 includes one or more data processing devices that implement the processes of the various embodiments of the present invention, including the example processes described herein. The phrases "data processing device" or "data processor" are intended to include any data processing device, such as a central processing unit (CPU), a digital signal processor (DSP), a field-programmable gate array (FPGA), a desktop computer, a laptop computer, a mainframe computer, or any other device for processing data, managing data, or handling data, whether implemented with electrical, magnetic, optical, biological components, or otherwise.

The sensors in the document sensing system 135 can include, for example, page-size sensors for detecting a size of the picked page, multi-page sensors for detecting multi-page feeds, skewed-page sensors for detecting skewed picked pages, bar code sensors for detecting bar codes on the picked page, orientation sensors for detecting an orientation of the scanned page, image quality sensors for sensing an image quality attribute of the picked page, copyrighted document sensors for detecting indications that a document may be copyrighted, wrinkled page sensors or jammed page sensors. In some embodiments, a single sensor (or set of sensors) can be used to provide information about a plurality of different attributes of the picked page. For example, a mechanical sensor that detects the presence of a page as it is transported by a particular location in the transport 45 can be used to detect the size of the picked page, and can also be used to detect jammed pages if the picked page does not pass by the sensor after a specified amount of time.

The sensors in the document sensing system 135 can be any type of sensor known in the art. Examples of sensor types that can be used in accordance with the present invention include ultrasonic sensors that sense properties of the picked page by sensing transmitted (or reflected) ultrasonic waves, mechanical sensors that sense mechanical properties of the picked page (e.g., page position, page size and page thickness), electronic sensors that sense electrical properties of the picked page (e.g., conductivity), optical sensors that sense optical properties of the picked page (e.g., density, color and gloss) and imaging sensors that capture images of the picked page that can be analyzed to determine document properties (e.g., document type, image content, and orientation).

In some embodiments, the image sensors in the bottom imaging device 35 and the top imaging device 30 can function as components of the document sensing system 135. In this case, the scanned images captured by the image sensors can be analyzed to determine various attributes of the picked page. For example, the scanned images can be analyzed to detect the edges of the picked pages, thereby providing information about page attributes such as the page size and skew angle. In this way, the image sensor can function as a page-size sensor and a skewed-page sensor. Similarly, the scanned images can be analyzed to detect a page orientation, for example by determining the orientation of text detected in the scanned images. In this way, the image sensor can function as an orientation sensor. The scanned images can be analyzed to determine one or more image quality attributes. In this way, the image sensor can function as an image quality sensor. The scanned images can be analyzed to detect the presence of information (e.g., copyright notices or associated security features) indicating that the document may be copyrighted. In this way, the image sensor can function as a copyrighted document detector. Likewise, the scanned images can be analyzed to detect certain types of multi-page feeds, for example by detecting shadows in the scanned images cast around the edges of a top page (or a stick-on note) onto a bottom page. In this way, the image sensor can function as a multi-page sensor.

The scanner 10 will also generally include a variety of other components that are not shown in FIG. 1. For example, a storage memory is generally provided for storing scanned documents, and an output interface 55 (such as a wired or wireless network connection) is generally provided for transferring scanned documents to an image receiving system (such as a storage device, a host computer, a printer or an E-mail system). In a preferred embodiment, a user interface system is provided including an image display 50 to communicate information to a user, and one or more user controls to receive input from the user. The user controls can be of any type known in the art such as buttons, rocker switches, joysticks, knobs, touch-sensitive surfaces, gesture sensing interfaces and audio interfaces. In some embodiments, the image display 50 can be a touch-sensitive display that can be used to display virtual user controls that can be activated by a touch of a user's finger.

Figure 2:
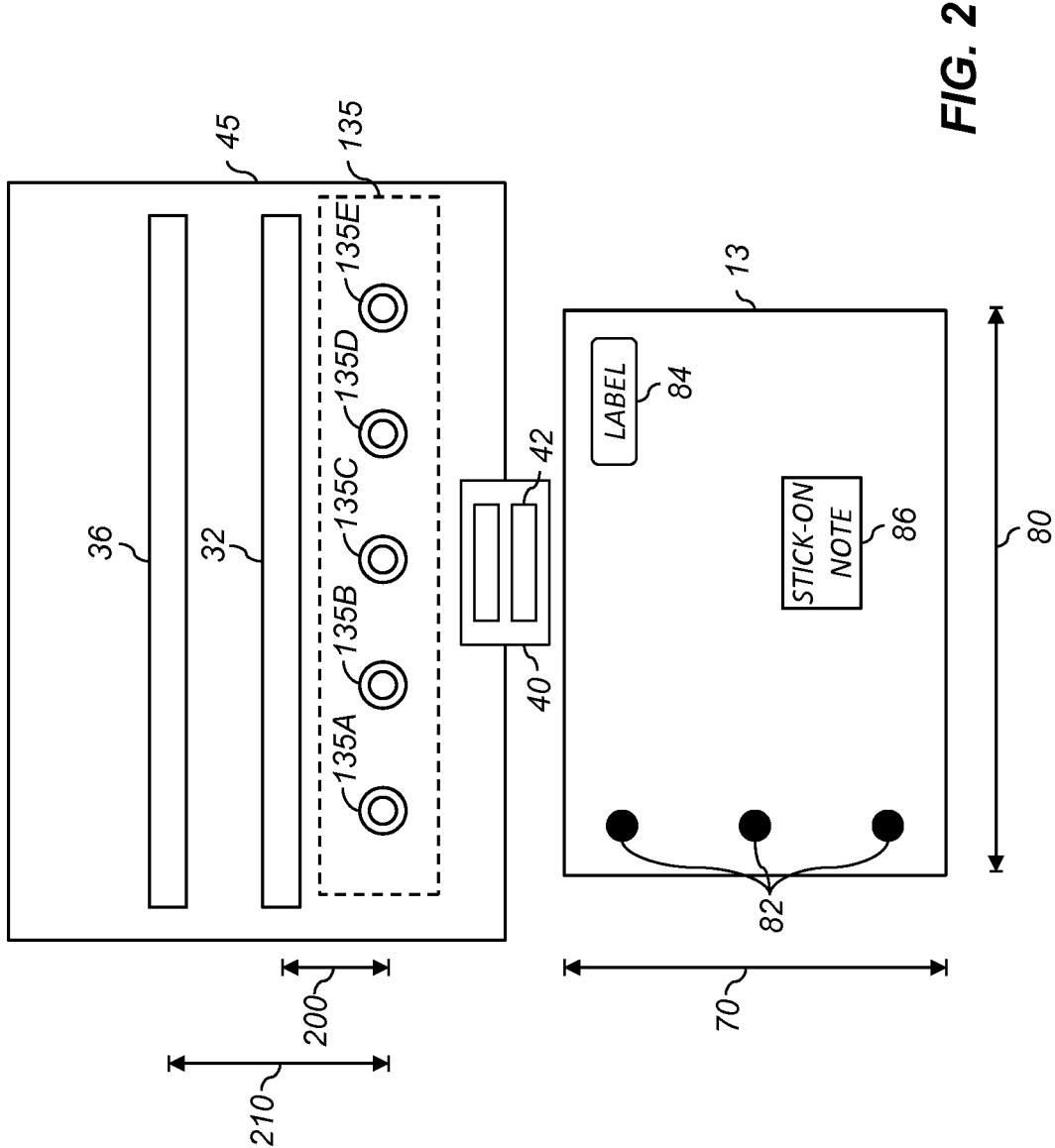
FIG. 2 is a perspective view showing the scanner transport and a document page illustrating various document characteristics.

FIG. 2 is a perspective view showing the scanner transport 45 and a particular page 13 of the multi-page document 12 (FIG. 1), which illustrates various page characteristics that can be sensed by the document sensing system 135 and can be relevant to processing the scanned document. The page characteristics include page length 70 and page width 80, as well as other page attributes such as the presence of holes 82 in the page, or the presence of an adhesive label 84 or a stick-on note 86 affixed to the page.

The illustrated document sensing system 135 includes five individual sensors 135A-135E. The sensors 135A-135E can be any type of sensor known in the art for sensing properties of the picked page as it is transported through the transport 45. In the illustrated embodiment, the sensors 135A-135E are arranged at different lateral positions across the width of the transport 45. In some embodiments, the document sensing system 135 can include additional sensors provided at various locations along the path of the document feeding system 43.

In some embodiments, the sensors 135A-135E are ultrasonic sensors which emit ultrasonic signals and detect signals that are transmitted through (or are reflected from) the picked page. The detected signals can be analyzed to not only detect the presence of a page at the sensor location, but also to determine various associated page attributes. For example, analysis of the phase and amplitude of the detected signals can be used to estimate the thickness of the picked page, and to detect the presence of air gaps indicating multi-page feeds. Methods for analyzing ultrasonic signals to determine page attributes that can be used in accordance with the present invention are described in U.S. Pat. No. 6,407,599 to Phinney, entitled "Method and apparatus for determining a digital phase shift in a signal;" U.S. Pat. No. 6,511,064 to Phinney et al., entitled "Method and apparatus for multiple document detection using ultrasonic phase shift amplitude;" U.S. Pat. No. 6,868,135, to Phinney, entitled "Method and apparatus for correcting for a phase shift between a transmitter and a receiver;" and U.S. Pat. No. 6,913,259 to Phinney et al., entitled "Apparatus for detection of multiple documents in a document transport," each of which are incorporated herein by reference.

In other embodiments, the sensors 135A-135E can be mechanical contact sensors that detect the presence of a page. For example, the mechanical contact sensors can include levers that are deflected as the page moves past the sensors. The amount of deflection can be used to provide information about the page thickness, which can in some cases be used to infer multi-page picks.

In addition to sensing properties of the picked page, the document sensing system provides information useful for proper control and timing of the page 13 as it travels through the scanner 10 (FIG. 1). For example, given a knowledge of the distance 200 between the sensors 135A-135E and the top imaging aperture 32 and the distance 210 between the sensors 135A-135E and the bottom imaging aperture 36, it can be determined when the page 13 will pass by the corresponding image sensors associated with top imaging device 30 and the bottom imaging device 35 based on the signals provided by the document sensing system 135.

Figure 3:
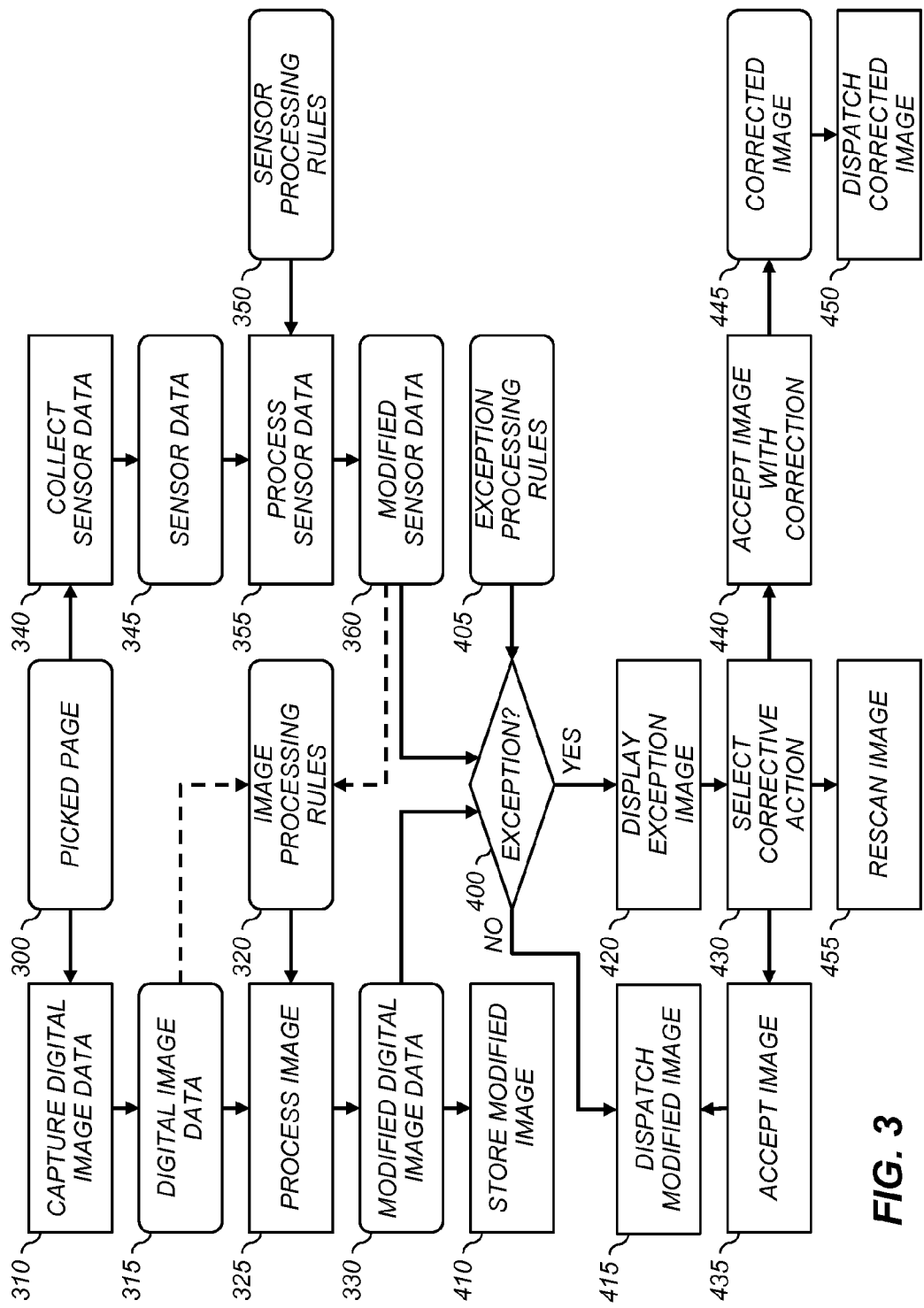
FIG. 3 is a flow diagram of a method for providing an exception correction capability in accordance with an embodiment of the invention.

FIG. 3 shows a flow chart of a method for providing an exception correction capability for a scanning system in accordance with the present invention. Exceptions can include "fault conditions," as well as other detected conditions for which the scanner operator may be required to perform an action or make a decision. In a preferred embodiment, the method is performed using the data processing system 120 in the scanner 10 of FIG. 1, together with other system components. The input to the method is a picked page 300 that is to be scanned by the scanner 10. The picked page 300 can be a text document, photograph or some combination thereof. In general, the picked page 300 will be a page of a multi-page document 12 (FIG. 1).

A capture digital image data step 310 is used to scan the picked page, providing digital image data 315. In a preferred embodiment, the capture digital image data step 310 captures digital image data 315 corresponding to the top surface of the picked page 300 using the top imaging device 30 and the bottom surface of the picked page 300 using the bottom imaging device 35. Each of the imaging devices will generally include a light source to illuminate the picked page and optics which focus light reflected from the picked page onto associated imaging sensors (not shown). The image sensors can, for example, be single-chip color CCD or CMOS image sensors. An Analog-to-Digital (A/D) converter is used to digitize data from the sensor to produce the digital image data 315.

The digital image data 315 is optionally processed using a process image step 325 based on a set of image processing rules 320 to provide modified digital image data 330. The process image step 325 can use any image processing operation known in the art to modify the digital image data 315. Examples of image processing operations that are commonly applied by the process image step 325 would include skew correction, orthogonal rotation, color filter array (CFA) interpolation, cropping, resizing (scaling), tone scale/color processing, image sharpening noise/defect removal and compression.

The image processing rules 320 can include parameters used to control the operation of the image processing operations, as well as logic rules controlling the number and order of the image processing operations that should be applied by the process image step 325. Commonly, some of the image processing rules 320 are predefined and fixed, while others may be customizable according to user preferences or document characteristics. In some embodiments, user interface elements can be provided to enable a user to adjust some or all the image processing rules 320 according to personal preferences and according to the input document type. In some embodiments, some of the image processing rules 320 can be defined in response to sensed attributes of the document being scanned. For example, a crop area for an image cropping operation can be defined based on the sensed page length 70 (FIG. 2) and page width 80 (FIG. 2) of the page 13 (FIG. 2), along with the sensed locations of the top and left page boundaries. Additional image processing rules 320 may be determined based on sensed attributes such as the document type, and the presence of holes 82 (FIG. 2), adhesive labels 84 (FIG. 2) or stick-on notes 86 (FIG. 2). After the digital image data 315 has been processed, the modified digital image data 330 is stored in a processor-accessible buffer memory using store modified image step 410, in preparation for sending it to the scanner's output interface 55, as well as for use in providing exception correction functionality.

As the picked page 300 is passing through the scanner 10 (FIG. 1), a collect sensor data step 340 is used to collect sensor data 345 from the various sensors in the document sensing system 135. Depending on the type of sensors that are used, the collect sensor data step 340 may utilize an analog-to-digital conversion process to provide digital signal values, as well as various analog and digital processing operations, to produce the sensor data 345.

In some embodiments, a process sensor data step 355 is used to process the sensor data 345 according to a set of sensor processing rules 350 to provide modified sensor data. The process sensor data step 355 can use any type of sensor processing known in the art to process the captured sensor data 345. For example, a noise removal process can be used to smooth out random variations in the sensor data. In a preferred embodiment, sensor data from ultrasonic sensors is processed using the methods described in U.S. Pat. No. 6,913,259 to Phinney et al., entitled "Apparatus for detection of multiple documents in a document transport," which is incorporated herein by reference, In some embodiments, the process sensor data step 355 can perform appropriate signal analysis tasks to analyze the sensor data 345 and determine various attributes of the picked page 300. For example, the sensor data 345 can be analyzed to determine physical page attributes such as the page length 70 (FIG. 2), the page width 80 (FIG. 2), a page thickness and a page skew angle. In some embodiments, the sensor data 345 can also be analyzed to detect various exception conditions (e.g., multi-page feeds or paper jams). In such cases, the modified sensor data 360 can include one or more parameters representing the determined attributes of the picked page 300 or the determined exception conditions.

The sensor processing rules 350 can include parameters used to control the operation of the data processing operations used by the process sensor data step 355, as well as logic rules controlling the number and order of the data processing operations that should be applied. Commonly, some of the sensor processing rules 350 are predefined and fixed, while others may be customizable according to user preferences or document characteristics, or may be determined in response to a preliminary analysis of the sensor data 345 or the digital image data 315. After the sensor data 345 has been processed, the modified sensor data 360 is generally stored in a processor-accessible buffer memory so that it is available for use in providing exception correction functionality and for determining appropriate image processing rules 320.

An exception test 400 is used to determine whether or not an exception condition exists responsive to the modified digital image data 330 or the modified sensor data 360, or both. The exception test 400 makes this determination based on a set of exception processing rules 405. The exception test 400 can determine whether an exception condition exists using any method known in the art. In some embodiments, the exception test 400 uses the methods described in commonly-assigned U.S. patent application Ser. No. 13/272,616 to Pultorak, entitled "Document scanner," or the methods described in commonly-assigned U.S. patent application Ser. No. 13/307,447, entitled "Method for scanning documents," by Link et al, each of which are incorporated herein by reference.

The exception processing rules 405 can be based on determined page attributes for the picked page 300 such as document type, page orientation, page thickness, page length 70 and page width 80. For example, exception processing rules 405 can be defined to flag picked pages 300 having page attributes that fall outside of a predefined range of acceptable values (e.g., the detected page thickness exceeds a maximum thickness). The exception processing rules 405 can also be based on other detected conditions such as the presence of holes 82, adhesive labels 84 or stick-on notes 86 on the picked page 300, or the detection of various exception conditions such as multi-page picks or paper jams. In some cases, exception conditions can be inferred based on combining signals detected by multiple sensors or for multiple pages. For example, if an orientation sensor determines that a front-side orientation associated with the front side of the picked page 300 is inverted relative to a back-side orientation associated with the back side of the picked page 300, then this is a good indication of a multi-page pick exception condition.

In some embodiments, the exception processing rules 405 can also be based on one or more confidence values determined by data processing algorithms associated with the process image step 325 or the process sensor data step 355. For example an orthogonal rotation algorithm can be used to analyze the digital image data 315 to automatically determine a rotation angle appropriate to rotate the image content in the digital image data 315 to an upright orientation. As part of the analysis process, a confidence value can be determined indicating how confident the algorithm was that the estimated rotation angle is correct. If the confidence level returned from the orthogonal rotation algorithm is below a specified threshold indicating that the determined orientation is inconclusive, an exception condition can be declared so that the operator can be prompted to perform exception processing.

It will be understood that the functions of the exception test 400 can be provided using a single programmable processor or by using multiple programmable processors, including one or more digital signal processor (DSP) devices. Alternatively, the exception test 400 step can be provided by custom circuitry (e.g., by one or more custom integrated circuits (ICs) designed specifically for use in digital scanners), or by a combination of programmable processor(s) and custom circuits.

If the exception test 400 does not detect an exception condition, then no exception processing is required and normal operation of the scanner continues. In this case, a dispatch modified image step 415 is used to send the modified digital image data 330 to the output interface 55 (FIG. 1). In some embodiments, the modified digital image data 330 may require further processing before it is sent to the output interface 55. For example, the modified digital image data 330 can be stored in a predefined file format such as a JPG file format or a PDF file format. For cases where the scanner 10 (FIG. 1) captures digital image data for both sides of the picked page 300, the store modified image step 410 will generally store modified digital image data 330 corresponding to both the top and bottom sides.

If the exception test 400 determines there is an exception condition, then the multi-page scanning operation is paused, and a display exception image step 420 is used to display at least one scanned page associated with the exception condition on the image display 50 (FIG. 1). In a preferred embodiment, the multi-page scanning operation is paused by disabling the feed module 42 so that no additional pages are picked, and moving any pages that are still in the transport 45 to the output tray 15. This will position the page for which the exception condition was detected on top of the pages in the output tray 15. (Depending on the nature of the exception condition, it may not always be required for the multi-page scanning operation to be paused while the exception processing is being performed.) In a preferred embodiment, the displayed scanned page is a thumbnail image corresponding to the modified digital image data 330 for the picked page 300 for which the exception condition was detected. (The thumbnail image is a low-resolution image that is generally derived by resizing the modified digital image data 330.) In some embodiments, a plurality of scanned pages can be displayed on the image display 50. For example, scanned images corresponding to both sides of the picked page can be displayed side by side. Additional information such as the exception type, the location of the detected exception within the scanned image and a determined confidence level associated with the detected exception can also be displayed to the scanner operator. The user (i.e., the scanner operator) can then preview the scanned image to evaluate the exception and determine the best corrective action. The display of the scanned image data provides information that is extremely useful to the user for making an accurate determination of an appropriate corrective action relative to prior art methods which generally only provide the user with an indication of the exception type (e.g., as a text string).

Various user interface elements are used to provide a plurality of user-selectable corrective actions associated with the exception condition. In a preferred embodiment, the image display 50 (FIG. 1) is used to provide a graphical user interface display that displays graphical elements associated with the available user-selectable corrective actions. User selections can then be made using appropriate user controls. Examples of user controls that can be used to receive user selections include buttons, rocker switches, joysticks, knobs, touch-sensitive surfaces, gesture sensing interfaces and audio interfaces. In some embodiments, some or all of user inputs are provided by using a touch screen graphical user interface on the surface of the image display 50. In other embodiments, user selections can be provided using user controls on an external device (e.g., a smart phone) via a tethered or wireless interface.

Figure 4:
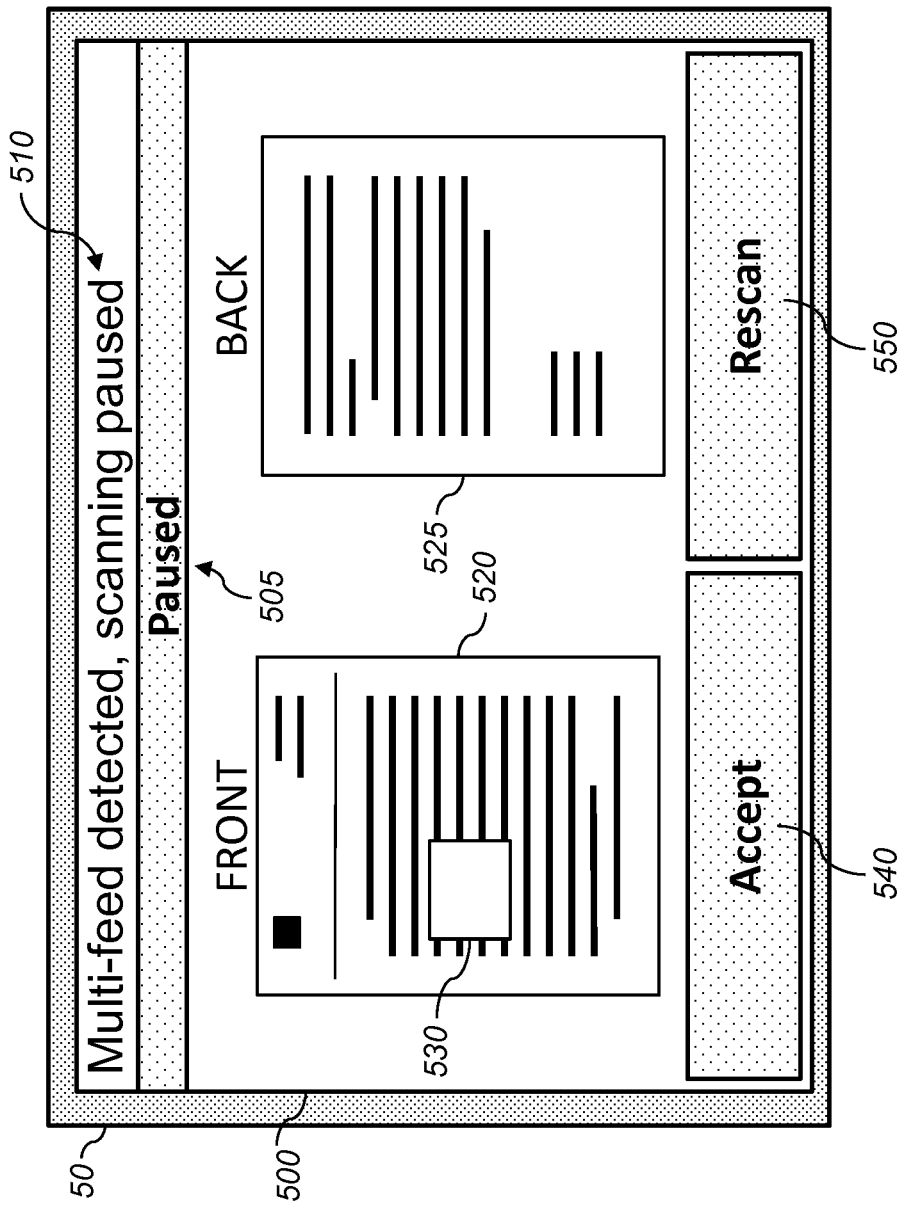
FIG. 4 is a pictorial view of an exemplary user interface screen including preview images.

FIG. 4 shows an example of a user interface screen 500 displayed on image display 50 where two user-selectable corrective actions are presented to the user in response to detecting a multi-page feed exception condition. The user interface screen includes a scanner status message 505 indicating that the multi-page scanning operation is paused, and an exception condition message 510 indicating that a multi-page feed exception condition was detected. A front side image 520 and a back side image 525 are displayed corresponding to the picked page 300 (FIG. 3) for which the exception condition was detected. It can be seen from the front side image 520 that a stick-on note 530 is affixed to the front side of the picked page 300, which is the reason that the exception condition was detected. The user interface screen 500 also includes two user controls associated with the user-selectable corrective actions: an accept user control 540 and a rescan user control 550. In a preferred embodiment, the image display 50 includes a touch sensitive surface so that the user controls can be activated by the user touching the corresponding locations on the image display 50. In other embodiments, buttons (or some other type of user control) can be provided adjacent to the image display 50, or a gesture sensing interface or an audio interface can be provided to enable the user to make selections using gestures or spoken commands.

The display of the scanned images on the user interface screen 500 (e.g., front side image 520 and back side image 525) provides the important advantage that the user is enabled to better determine an appropriate corrective action. For example, if the user sees that the multi-page feed exception was caused by stick-on note 530 then the user can decide that an appropriate action would be to remove the stick-on note 530 and rescan the page, but if the user sees that the multi-page feed exception was caused by an adhesive label 84 (FIG. 2) then the user can choose to accept the scanned image and continue with the multi-page scanning operation.

In various embodiments, additional information can be presented on the user interface screen 500. In some embodiments, graphical elements can be overlaid on the front side image 520 or the back side image 525 that highlight the location that the exception was detected within the scanned document to help identify the exception to the scanner operator. For example, a flashing outline can be drawn around the stick-on note 530 to indicate that this is the location where the multi-page feed was detected.

In still other embodiments, user interface elements can be provided to enable the scanner operator to zoom and pan through the displayed images to allow for a closer review of the cause of the exception condition.

In some embodiments, user interface elements can be provided to enable the scanner operator to modify the image processing rules 320, the sensor processing rules 350 or the exception processing rules 405 according to their preferences. In some embodiments, the user controls can enable the scanner operator to choose between changing the rules for only the current multi-page scanning operation, or whether they should be changed for all future scanning operations. Modifying the exception processing rules 405 can include enabling the scanner operator to specify a preferred corrective action that should be applied when a specific exception condition is detected. This functionality can be used to provide a "learn mode" where the scanner would automatically perform the corrective action for future instances of the same exception condition, instead of repeatedly requiring the scanner operator to select the same corrective action. This can be valuable in many situations, such as when multiple pages in a multi-page document produce the same exception condition (e.g., if all of the pages are upside down).

In some embodiments, the user interface of the scanner 10 can include a means for audio processing which can be used to provide information to the user or receive input from the user. For example, exception information can be presented to the scanner operator using audio signals and input can be received from the user through a voice-activated interface. The audio signals can include various tones, as well as more sophisticated sounds such as verbal messages. The verbal messages can be generated using computer speech generation or can be pre-recorded messages. For example, while scanning a batch of documents, the scanner 10 can verbally notify the user that a check was detected and ask the user whether or not the check information should be sent to the billing department. (In this example, it would not be necessary for the multi-page scanning operation to be paused while the exception processing was being performed since none of the available corrective actions require rescanning the picked page 300.)

In some embodiments, the audio signals can be presented to the user using audio user interface elements provided on a remote electronic device. For example, the scanner 10 can use a wireless communication network to transmit information about the exception condition to a handheld electronic device such as a smart phone. An application running on the smart phone can provide a verbal message to the user alerting the user of the exception condition. The handheld electronic device can optionally present graphical user interface elements such as those shown on the user interface screen 500 of FIG. 4. The user can then use spoken commands (or other user controls) to select an appropriate corrective action. An indication of the selected corrective action can then be transmitted back to the scanner 10 using the wireless communication network.

Returning to a discussion of FIG. 3, the user next performs a select corrective action step 430 by activating one of the user controls to select a particular corrective action. According to the example shown in FIG. 4, the user can select the accept user control 540 (e.g., if it is acceptable that the stick-on note 530 is included in the scanned image), which passes control to an accept image step 435. In a preferred embodiment, the accept image step 435 restarts the paused multi-page scanning operation and calls the dispatch modified image step 415, which sends the modified digital image data 330 to the output interface 55 (FIG. 1).

If the user selects the rescan user control 550, control is passed to a rescan image step 455. In a preferred embodiment, the rescan image step 455 displays user interface elements on the image display 50 including a message prompting the user to manually move the picked page 300 from the output tray 15 (FIG. 1) back to the input tray 20 (FIG. 1) and a user control that can be activated when the manual operation is complete. In this example, the user would remove the stick-on note 530 from the picked page 300 before putting it back into the input tray 20. When the user activates the user control indicating that the manual operation is complete, the multi-page scanning operation is then restarted. In some embodiments, the picked page 300 for which the exception condition was detected can be held in the output roller 100, and if a rescan option is selection, the transport 45 is run backwards to put the picked page 300 back into the input tray 20.

In some embodiments, the set of user-selectable corrective actions can include an accept image with correction option, which enables the user to specify that one or more correction operations should be applied to the scanned image before it is dispatched to the output interface 55 (FIG. 1). For example, if the detected exception condition indicates that the page was scanned in an inverted orientation, a user control can be provided that enables the user to specify that the image should be rotated to the proper orientation before it is dispatched. In this case an accept image with correction step 440 is called, which applies one or more correction operations to determine a corrected image 445 and restarts the multi-page scanning operation. In some embodiments, the correction operations can include an operation which stores metadata associated with the detected exception condition in association with the scanned image rather than actually modifying the pixels values associated with the modified digital image data 330. A dispatch corrected image step 450 is used to send the corrected image 445 to the output interface 55 (FIG. 1).

In some embodiments, the detection of a particular exception condition or the selection of a particular corrective action can be used to control various mechanical or electrical components of the scanner 10 (FIG. 1). For example, components of the document feeding system, such as the output rollers 100 (FIG. 1), can be used to control the stacking or sorting of the document pages. For example, document pages for which exception conditions are detected can be routed or sorted into a different output tray 15 (FIG. 1). In some embodiments this can be done by changing the path the document page takes within the transport 45 (FIG. 1) or by changing the speed of the output rollers 100. (This can be accomplished using the method taught in commonly-assigned U.S. patent application Ser. No. 13/155,838 to Reinke et al., entitled "Sorting by controlling scanned document velocity," which is incorporated herein by reference.) Similarly, the pages of the document can be directed along different paths according to sensed page attributes. For example, pages of certain size or type (e.g., checks), can be directed to a certain output tray.

When the multi-page scanning operation has been completed, the scanned pages are generally sent to one or more image receiving systems using the output interface 55 (FIG. 1). In a preferred embodiment, the image receiving system can be selected by the scanner operator using appropriate user interface elements. The image receiving systems can include storage devices (e.g., hard disks or network servers), a host computer (e.g., a personal computer, a network computer or a hand-held computing device such as a tablet computer or a smart phone), a printer or an E-mail system. In some embodiments, the same scanned document can be sent to multiple image receiving systems. In some embodiments, an image receiving system to which some or all of the pages of the scanned document should be sent can be determined responsive to sensed characteristics of the document or to any detected exception conditions. For example, if an exception condition is detected, the associated page can be sent to a smart phone designated by the scanner operator to alert the scanner operator that an exception condition has been detected. Similarly, pages having certain characteristics (e.g., features that identify the page as a check) can be routed to a particular image receiving system (e.g., a server associated with the billing department).

The invention has been described in detail with particular reference to certain preferred embodiments thereof, but it will be understood that variations and modifications can be effected within the scope of the invention.

PARTS LIST 10 scanner
11 top page
12 multi-page document
13 page
15 output tray
20 input tray
30 top imaging device
32 top imaging aperture
35 bottom imaging device
36 bottom imaging aperture
40 feed roller
41 separation roller
42 feed module
43 document feeding system
45 transport
50 image display
55 output interface
70 page length
80 page width
82 holes
84 adhesive label
86 stick-on note
100 output rollers
120 data processing system
135 document sensing system
135A sensor
135B sensor
135C sensor
135D sensor
135E sensor
200 distance
210 distance
300 picked page
310 capture digital image data step
315 digital image data
320 image processing rules
325 process image step
330 modified digital image data
340 collect sensor data step
345 sensor data
350 sensor processing rules
355 process sensor data step
360 modified sensor data
400 exception test
405 exception processing rules
410 store modified image step
415 dispatch modified image step
420 display exception image step
430 select corrective action step
435 accept image step
440 accept image with correction step
445 corrected image
450 dispatch corrected image step
455 rescan image step
500 user interface screen
505 scanner status message
510 exception condition message
520 front side image
525 back side image
530 stick-on note
540 accept user control
550 rescan user control

The invention claimed is:

1. A scanning system providing an exception correction capability, comprising:
an image sensor for scanning a page of a hard-copy document;
an input tray;
an output tray;
a document feeding system for picking a page of a multi-page document from the input tray, positioning the picked page to be scanned by the image sensor, and depositing the picked page in the output tray;
a sensing system for sensing one or more attributes of the picked page to detect an exception condition;
a user interface system including an image display and one or more user controls;
an output interface for transferring scanned documents to an image receiving system;
a storage memory for storing scanned documents;
a data processing system; and
a program memory communicatively connected to the data processing system and storing instructions configured to cause the data processing system to implement a method for providing an exception correction capability, wherein the method includes:
initiating a multi-page scanning operation to scan a multi-page document in response to user activation of a user control;
for each page of the multi-page document;
picking the page from the input tray;
scanning the picked page using the image sensor and storing the scanned page in the storage memory;
sensing one or more attributes of the picked page using the sensing system;
depositing the picked page in the output tray analyzing the sensed one or more attributes to detect an exception condition;

in response to detecting an exception condition:
  pausing the multi-page scanning operation;
  displaying at least one scanned page associated with the exception condition on the image display;
  using the user interface system to provide a plurality of user-selectable corrective actions associated with the exception condition, wherein the user interface system includes a user control to select an option to apply the same corrective action for future instances of the same exception condition;
  performing one or more corrective operations in response to a user selecting a particular corrective action; and
  restarting the paused multi-page scanning operation in response to user activation of a user control; and
using the output interface to transfer one or more pages of the scanned multi-page document from the storage memory to the image receiving system.

2. The scanning system of claim 1 wherein at least one of the corrective operations includes prompting the user to perform a manual operation.

3. The scanning system of claim 2 wherein the particular corrective action is a rescan action, and wherein the corrective operations include prompting the user to manually move the picked page from the output tray to the input tray.

4. The scanning system of claim 1 wherein the sensing system includes a multi-page sensor for detecting multi-page-feeds.

5. The scanning system of claim 4 wherein the multi-page sensor is an ultrasonic sensor or a mechanical contact sensor.

6. The scanning system of claim 4 wherein the image sensor is the multi-page sensor, and wherein the scanned page is analyzed to detect page edges or shadows.

7. The scanning system of claim 1 wherein the sensing system includes a skewed-page sensor for detecting skewed picked pages.

8. The scanning system of claim 7 wherein the image sensor is the skewed-page sensor, and wherein the scanned page is analyzed to detect that the page was skewed.

9. The scanning system of claim 1 wherein the sensing system includes an orientation sensor for detecting an orientation of the scanned page.

10. The scanning system of claim 9 wherein the image sensor is the orientation sensor, and wherein the scanned page is analyzed to detect the orientation of the scanned page.

11. The scanning system of claim 9 wherein an exception condition is detected when the orientation sensor detects an inconclusive orientation of the scanned page.

12. The scanning system of claim 9 wherein when the orientation sensor detects that the orientation of the scanned page is not an upright orientation the user-selectable corrective actions include an image rotation action to correct the orientation of the scanned page.

13. The scanning system of claim 1 wherein the sensing system includes a page-size sensor, an image quality sensor, a copyrighted document sensor, a wrinkled page sensor or a jammed page sensor.

14. The scanning system of claim 1 wherein the scanning system is a duplex scanning system adapted to scan both sides of the picked pages.

15. The scanning system of claim 14 wherein an exception condition is sensed if a detected front-side orientation is determined to be inconsistent with a detected back-side orientation.

16. The scanning system of claim 1 wherein the image receiving system is a storage device, a host computer, a printer or an E-mail system.

17. The scanning system of claim 1 wherein the image receiving system is selected in response to the exception condition.

18. The scanning system of claim 1 wherein the document feeding system controls the path of the picked page response to the exception condition.

19. The scanning system of claim 1 wherein at least some of the user controls are provided on an external device that is wirelessly connected to the scanning system.

20. The scanning system of claim 1 wherein the user controls include a voice-activated interface for receiving spoken commands from the user.

21. A method for scanning multi-page documents, the method being implemented at least in part by a data processing system and comprising:
  initiating a multi-page scanning operation on a scanning system to scan a multi-page document, wherein the scanning system includes:
    an image sensor for scanning a page of a hard-copy document;
    a document feeding system for picking a page of a multi-page document from an input tray, positioning the picked page to be scanned by the image sensor, and depositing the picked page in an output tray;
    a sensing system for sensing one or more attributes of the picked page to detect an exception condition;
    a user interface system including an image display and one or more user controls;
    a storage memory for storing scanned documents; and
    an output interface for transferring scanned documents to an image receiving system;
  for each page of the multi-page document;
    picking the page from the input tray;
    scanning the picked page using the image sensor and storing the scanned page in the storage memory;
    sensing one or more attributes of the picked page using the sensing system;
    depositing the picked page in the output tray analyzing the sensed one or more attributes to detect an exception condition;
    in response to detecting an exception condition:
      pausing the multi-page scanning operation;
      displaying at least one scanned page associated with the exception condition on the image display;
      using the user interface system to provide a plurality of user-selectable corrective actions associated with the exception condition, wherein the user interface system includes a user control to select an option to apply the same corrective action for future instances of the same exception condition;
      performing one or more corrective operations in response to a user selecting a particular corrective action; and
      restarting the paused multi-page scanning operation in response to user activation of a user control; and
    using the output interface to transfer one or more pages of the scanned multi-page document from the storage memory to the image receiving system.

* * * * *